(12) United States Patent
Inoue et al.

(10) Patent No.: US 7,387,727 B2
(45) Date of Patent: Jun. 17, 2008

(54) CONTAMINATED LIQUID FILTRATION SYSTEM VEHICLE

(75) Inventors: Masahito Inoue, Tokyo (JP); Kouichi Inoue, Nagoya (JP)

(73) Assignee: Zeotek Research Institute Ltd., Tokyo (JP)

( * ) Notice: Subject to any disclaimer, the term of this patent is extended or adjusted under 35 U.S.C. 154(b) by 195 days.

(21) Appl. No.: 10/560,049

(22) PCT Filed: Jun. 10, 2003

(86) PCT No.: PCT/JP03/07310

§ 371 (c)(1),
(2), (4) Date: Dec. 8, 2005

(87) PCT Pub. No.: WO2004/110590

PCT Pub. Date: Dec. 23, 2004

(65) Prior Publication Data

US 2007/0090038 A1     Apr. 26, 2007

(51) Int. Cl.
*B01D 29/00* (2006.01)
(52) U.S. Cl. .............. 210/241; 210/748; 210/609; 210/747
(58) Field of Classification Search .............. 210/748, 210/241, 609, 747
See application file for complete search history.

(56) References Cited

U.S. PATENT DOCUMENTS

| | | | | |
|---|---|---|---|---|
| 4,411,785 A | * | 10/1983 | Yu et al. | 210/321.69 |
| 5,102,503 A | * | 4/1992 | Silinski et al. | 202/83 |
| 5,468,385 A | | 11/1995 | Inoue | |
| 6,482,124 B2 | * | 11/2002 | Hormann et al. | 477/99 |
| 6,808,626 B2 | * | 10/2004 | Kulbeth | 210/241 |

FOREIGN PATENT DOCUMENTS

| | | |
|---|---|---|
| JP | 7-280696 | 10/1995 |
| JP | 8-39097 | 2/1996 |
| JP | 8-108020 | 4/1996 |
| JP | 10-204920 | 8/1998 |
| JP | 2002-136803 | 5/2002 |

* cited by examiner

*Primary Examiner*—Walter D. Griffin
*Assistant Examiner*—Cameron J Allen
(74) *Attorney, Agent, or Firm*—Kratz, Quintos & Hanson, LLP

(57) ABSTRACT

An object of the present invention is to provide a vehicle which is capable of recycling contaminated liquid in a factory or the like swiftly and efficiently without performing incineration. In order to achieve this object, a contaminated liquid filtration system vehicle is characterized in comprising: vehicle driving unit comprising a driving engine and a driving mechanism; suction unit for aspirating the contaminated liquid within a contaminated liquid collection unit as liquid to be treated; a filtration system constituted by a charged filter device and a charged coalescer type oil water separator for filtration treating the aspirated liquid to be treated; electric power supply unit for supplying a driving power source to the filtration system; delivery unit for returning treated liquid which has been treated in the filtration system to the same or a different collection unit in the factory or the like; and control unit for controlling operations of the filtration system, wherein the charged filter device is caused to advance the filtration of impurity particles by applying a voltage between electrodes within the charged filter device using the driving power source supplied from the electric power supply unit, and the charged coalescer type oil water separator is caused to advance oil water separation by applying a voltage between electrodes within the oil water separator using the driving power source supplied from the electric power supply unit.

14 Claims, 2 Drawing Sheets

CONTAMINATED LIQUID FILTRATION SYSTEM VEHICLE

TECHNICAL FIELD

The present invention relates to a vehicle which travels to a contaminated liquid collection unit in a factory or the like and treats the contaminated liquid in the collection unit.

BACKGROUND ART

In conventional maintenance of contaminated liquid treatment facilities comprising a submerged membrane separator, a maintenance vehicle for a membrane filtration type septic tank which comprises a plurality of exchangeable membrane cartridges, a membrane cartridge case which houses a unit of the membrane cartridges and doubles as a cleaning tank, a storage tank which can be used for many purposes, a pump which aspirates and discharges internal fluid in the tank, and a flexible hose which selectively connects the tank, the membrane cartridge case, the storage tank, and the pump to each other, and which is capable of moving a liquid mixture inside the tank and performing maintenance such as cleaning and exchanging the membrane cartridges in a self-contained manner, has been disclosed (see Japanese Patent Publication 2002-153870).

This maintenance vehicle moves an appropriate amount of the in-tank liquid mixture of the membrane treatment type contaminated liquid treatment facility to the storage tank, thereby exposing each of the membrane cartridges inside the tank above the liquid level. When an extracted membrane cartridge needs to be exchanged due to damage or the like, the membrane cartridge is exchanged to another membrane cartridge carried in the vehicle, and when cleaning is required, the extracted membrane cartridge is stored in the membrane cartridge case and cleaned. Following cleaning, the membrane cartridges extracted from the membrane cartridge case are returned to the membrane treatment type contaminated liquid treatment facility. The in-tank liquid mixture which was removed to the storage tank is then returned to the membrane treatment type contaminated liquid treatment facility, and thus membrane cartridge maintenance is performed.

In general, the various types of concentrated contaminated liquid generated in factories are conventionally disposed of by incineration. In so doing, however, problems such as the generation of dioxins caused by chemical substances contained in the contaminated liquid, dispersion of environmental hormones into the atmosphere, and generation of carbon dioxide upon incineration may arise. As a result of such concerns, in recent years restrictions have been placed on dioxin concentration, chlorine concentration, oxygen concentration, odor, and so on, and it is anticipated that the incineration disposal performed conventionally will become more and more difficult in the future. Hence alternative treatment methods are being sought.

In response to such societal demands, the present applicants have proposed a large number of contaminated liquid treatment devices in Japanese Patent 3155212, Japanese Patent 3236570, and so on. If these treatment devices were to be provided in factories around the country, the problems of such incineration disposal would be considerably reduced. However, the intensity of societal demands for environmental protection is ever increasing, and therefore methods which are simultaneously faster and more efficient are required.

In consideration of the circumstances described above, the problem to be solved by the present invention is the provision of a vehicle which is capable of treating contaminated liquid from factories and the like using methods such as recycling and contamination reduction, quickly and efficiently, and without incineration.

DISCLOSURE OF THE INVENTION

In order to solve the problem described above, the present invention is constituted by a contaminated liquid filtration system vehicle which travels to a contaminated liquid collection unit in a factory or the like and treats the contaminated liquid within the collection unit, characterized in comprising: vehicle driving unit comprising a driving engine and a driving mechanism; suction unit for aspirating the contaminated liquid within collection unit as liquid to be treated; a filtration system constituted by a charged filter device and a charged coalescer type oil water separator for filtration treating the aspirated liquid to be treated; electric power supply unit for supplying a driving power source to the filtration system; delivery unit for returning treated liquid which has been treated in the filtration system to the same or a different collection unit in the factory or the like; and control unit for controlling operations of the filtration system, wherein the charged filter device is caused to advance the filtration of impurity particles by applying a voltage between electrodes within the charged filter device using the driving power source supplied from the electric power supply unit, and the charged coalescer type oil water separator is caused to advance oil water separation by applying a voltage between electrodes within the oil water separator using the driving power source supplied from the electric power supply unit.

Further, the present invention is constituted by a contaminated liquid filtration system vehicle which travels to a contaminated liquid collection unit in a factory or the like and treats the contaminated liquid within the collection unit, characterized in comprising: a vehicle driving unit comprising an engine and a driving mechanism; a suction unit for aspirating the contaminated liquid within the contaminated liquid collection unit as liquid to be treated; a filtration system constituted by a charged filter device, a charged coalescer type oil water separator, and a microfiltration device comprising hollow fiber membranes of an internal pressure circulation system, for filtration treating the aspirated liquid to be treated; an electric power supply unit for supplying a driving power source to the filtration system; a delivery unit for returning treated liquid which has been treated in the filtration system to the same or a different collection unit in the factory or the like; and a control unit for controlling operations of the filtration system, wherein the charged filter device is caused to advance the filtration of impurity particles by applying a voltage between electrodes within the charged filter device using the driving power source supplied from the electric power supply unit, the charged coalescer type oil water separator is caused to advance oil water separation by applying a voltage between electrodes within the oil water separator using the driving power source supplied from the electric power supply unit, and the microfiltration device comprises a primary side circulation path for circulating the liquid to be treated and a discharge path which is bifurcated therefrom to discharge concentrated liquid, an open/close valve being provided on the discharge path and the control unit controlling the discharge of the concentrated liquid by opening the open/ close valve at predetermined time intervals set in accordance with the type of the liquid to be treated.

It is preferable that the discharge path to discharge the concentrated liquid bifurcate from the primary side circulation path of the microfiltration device, the open/close valve be provided on the discharge path, a concentration detection unit for detecting the density of the concentrated liquid be provided on the primary side circulation path, and the control unit control the discharge of the concentrated liquid by opening the open/close valve when the density of the concentrated liquid in the primary side circulation path, which is detected by the concentration detection unit, exceeds a predetermined value.

In this case, it is preferable that the concentration detection unit be constituted by a pressure sensor for detecting pressure change inside the primary side circulation path such that concentration variation is detected indirectly according to the viscous resistance of the liquid to be treated flowing through the circulation path.

Further, a sensor is preferably provided to detect irregularities in the open/close valve, and a warning unit are preferably provided by a warning signal in case of the irregularities in the open/close valve detected by the sensor.

It is also preferable that the discharge path to discharge the concentrated liquid bifurcate from the primary side circulation path of the microfiltration device, the open/close valve be provided on the discharge path, and the control unit makes a warning signal such as a light or sound to inform the operator to open the open/close valve following the elapse of a predetermined time period set in accordance with the type of the liquid to be treated.

It is also preferable that a sensor be provided for detecting irregularities in the pump of the microfiltration device, and that warning unit be provided by a warning signal in case of irregularities in the pump detected by the sensor.

Further, the present invention provides a contaminated liquid filtration system vehicle which travels to a contaminated liquid collection unit in a factory or the like and treats the contaminated liquid within the collection unit, characterized in comprising: vehicle driving unit comprising a driving engine and a driving mechanism; suction unit for aspirating the contaminated liquid within the contaminated liquid collection unit as liquid to be treated; a filtration system constituted by a charged filter device, a charged coalescer type oil water separator, and a microfiltration device comprising hollow fiber membranes of an internal pressure circulation system, for filtration treating the aspirated liquid to be treated; electric power supply unit for supplying a driving power source to the filtration system; delivery unit for returning treated liquid which has been treated in the filtration system to the same or a different collection unit in the factory or the like; and control unit for controlling operations of the filtration system, wherein the charged filter device is caused to advance the filtration of impurity particles by applying a voltage between electrodes within the charged filter device using the driving power source supplied from the electric power supply unit, the charged coalescer type oil water separator is caused to advance oil water separation by applying a voltage between electrodes within the oil water separator using the driving power source supplied from the electric power supply unit, the microfiltration device comprises a primary side circulation path for circulating the liquid to be treated and a discharge path which is bifurcated therefrom to discharge concentrated liquid, an open/close valve being provided on the discharge path and the control unit controlling the discharge of concentrated liquid by opening the open/close valve at predetermined time intervals set in accordance with the type of the liquid to be treated, and air supply pipes connected to the charged filter device, oil water separator, and microfiltration device to drain each of the devices are disposed in a single location, open/close valves being installed side by side on each of the pipes.

A suction pipe for aspirating the contaminated liquid in the contaminated liquid collection unit is preferably provided as the suction unit, an electromagnetic valve is preferably provided at a point on the suction pipe in order to open and close the pipe, and the control unit preferably prevent improper use by closing the electromagnetic valve during draining.

Further, an image capturing device is preferably provided for capturing images of constitutional elements such as the piping of the filtration system, and a memory device is preferably provided for storing and managing image information captured by the image capturing device.

A power generating device which is driven by the driving engine constituting the vehicle driving unit is preferably provided as the electric power supply unit.

The filtration system is preferably installed on a load-carrying platform which is removably connected to the vehicle main body, and the filtration system is preferably constituted so as to be detachable with the cargo compartment'.

Figure 1:
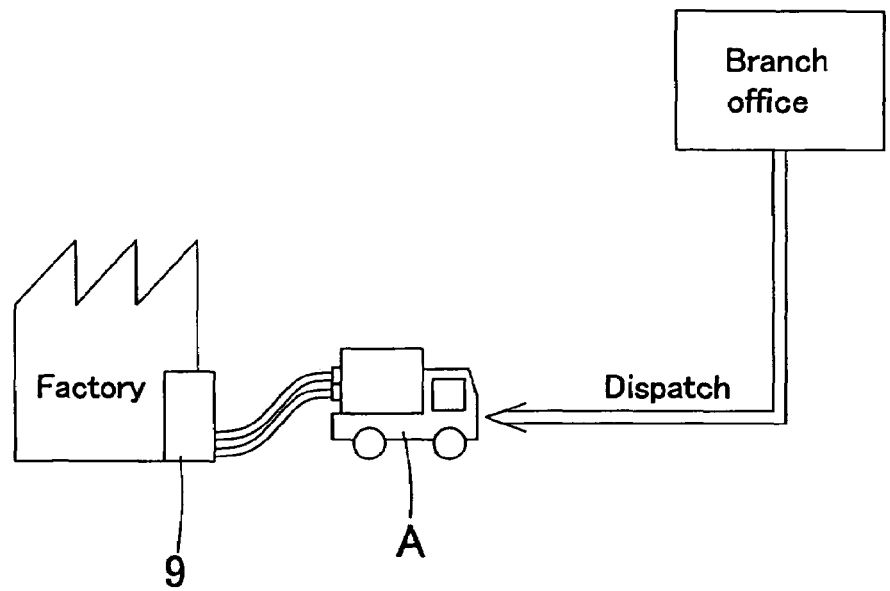
FIG. 1 is an illustrative diagram showing the constitution of a treatment service using a contaminated liquid filtration system vehicle according to a representative embodiment of the present invention.
Figure 2:
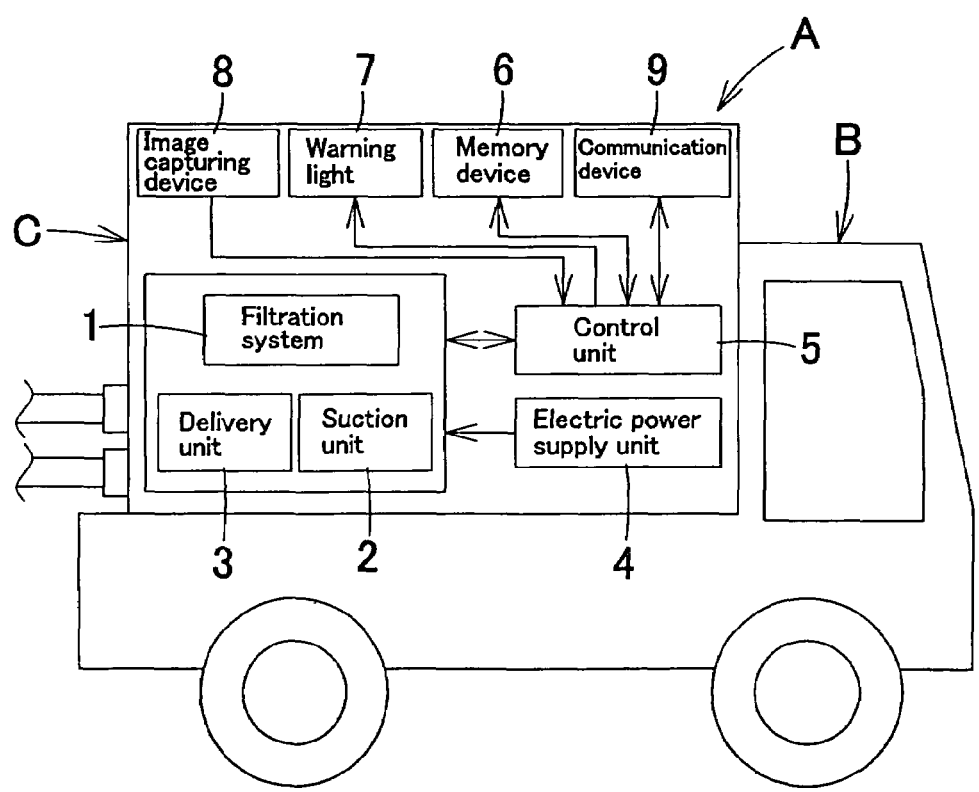
FIG. 2 is an illustrative diagram showing the constitution of the same contaminated liquid filtration system vehicle.

DESCRIPTION OF REFERENCE SYMBOLS IN THE DRAWINGS 1 filtration system
2 suction unit
3 delivery unit
4 electric power supply unit
5 control unit
6 memory device
7 warning light
8 image capturing device
9 communication device
11 strainer
12 charged filter device
13 oil water separator
14 microfiltration device
15 pump
16 flow regulating valve
17 pressure gauge
18 pressure switch
19 automatic valve
20, 21 charge sources
22 introduction passage
23 primary side circulation path
24 delivery passage
25 valve
26 check valve
27 vacuum gauge 28 reflux passage
29 motor-operated valve
30 integrating flowmeter
31 pump
32 heater
33 microfiltration unit
34 valve
35 discharge passage
36 open/close valve
37 concentration detection unit
38, 39, 40, 41 air supply pipes
42, 43, 44, 45 open/close valves
46 electromagnetic valve
47 suction pipe
48 booster pump
49, 50 open/close valves
51 open/close valve
A vehicle
F1 filter
F2 compound filter

BEST MODE FOR CARRYING OUT THE INVENTION

As shown in FIG. 1, a contaminated liquid filtration system vehicle A of the present invention travels to a contaminated liquid collection unit 9 such as a contaminated liquid tank in a factory and treats the contaminated liquid in the collection unit. The vehicle A comprises a suction unit 2 for aspirating the contaminated liquid inside the contaminated liquid collection unit 9 as liquid to be treated, a filtration system 1 for filtration treating the aspirated liquid to be treated, an electric power supply unit 4 for supplying a driving power source to the filtration system 1, a delivery unit 3 for returning the treated liquid which has been treated in the filtration system 1 to the same or a different collection unit in the factory or the like, and a control unit 5 such as a computer for controlling operations of the filtration system 1, and further comprises a vehicle driving unit comprising an engine and a driving mechanism which are not shown in the drawings.

These components are provided on a load-carrying platform part of a mobile truck, and in this example are disposed in an enclosed cargo compartment C of a van-type mobile truck B which comprises such a cargo compartment.

The left and right side panels and rear tailgate panel surrounding the periphery of the cargo compartment are constituted openably and swingably at a horizontal axis such that when each or all of these panels is opened, the filtration system 1 can be used more efficiently. However, a vehicle in which the side panels cannot be opened and closed or in which no side panels are provided may also be used. The tailgate, which is the rear panel of the cargo compartment C, is also provided openably, but this tailgate may be constituted such that it cannot be opened and closed.

Heavy loads such as a power generating device constituting the aforementioned electric power supply unit 4, the control unit 5 constituted by a computer comprising a memory device and an operating unit, and a communication device 9 are disposed in locations on the operating cab side of the cargo compartment (the front side of the main body), whereas the filtration system 1 is disposed in a location at the rear side of the cargo compartment apart from the operating cab side. Thus the center of gravity in the front and rear directions of the entire vehicle A does not shift toward the rear side. The control unit 5 and communication device 9 are disposed on a setting above the power generating device.

The operating unit of the power generating device faces toward the side portion of the load-carrying platform such that the power generating device can be operated without climbing into the cargo compartment.

The power generating device may be driven by the engine of the aforementioned vehicle driving unit, or may comprise a driving unit which is independent of the engine.

A space into which an operator may enter is preserved between the control unit 5 and filtration system 1 such that a rearward-facing control panel switch may be operated. Here, the filtration system 1 is driven using the power generating device, but may be driven using a voltage from the battery of the vehicle A. In so doing, the overall weight of the vehicle A may be lightened. In this example, the operator inputs information such as an operator ID, a client ID, a processing unit price into the control panel at the beginning of an operation, and when the information is confirmed, the control unit 5 control the operation of the filtration system 1 such that contaminated liquid treatment work begins. Upon completion of the work, the contaminated liquid processing amount is measured by an integrating flowmeter 30 to be described hereinafter, whereupon proceeds are calculated, work report data are created per work unit and these data are transmitted by the communication device 9 to a branch office. Thus the operation is complete. Communication between the vehicle and the branch office is performed over a mobile communication network used by a portable telephone, personal handyphone system, or similar.

Figure 3:
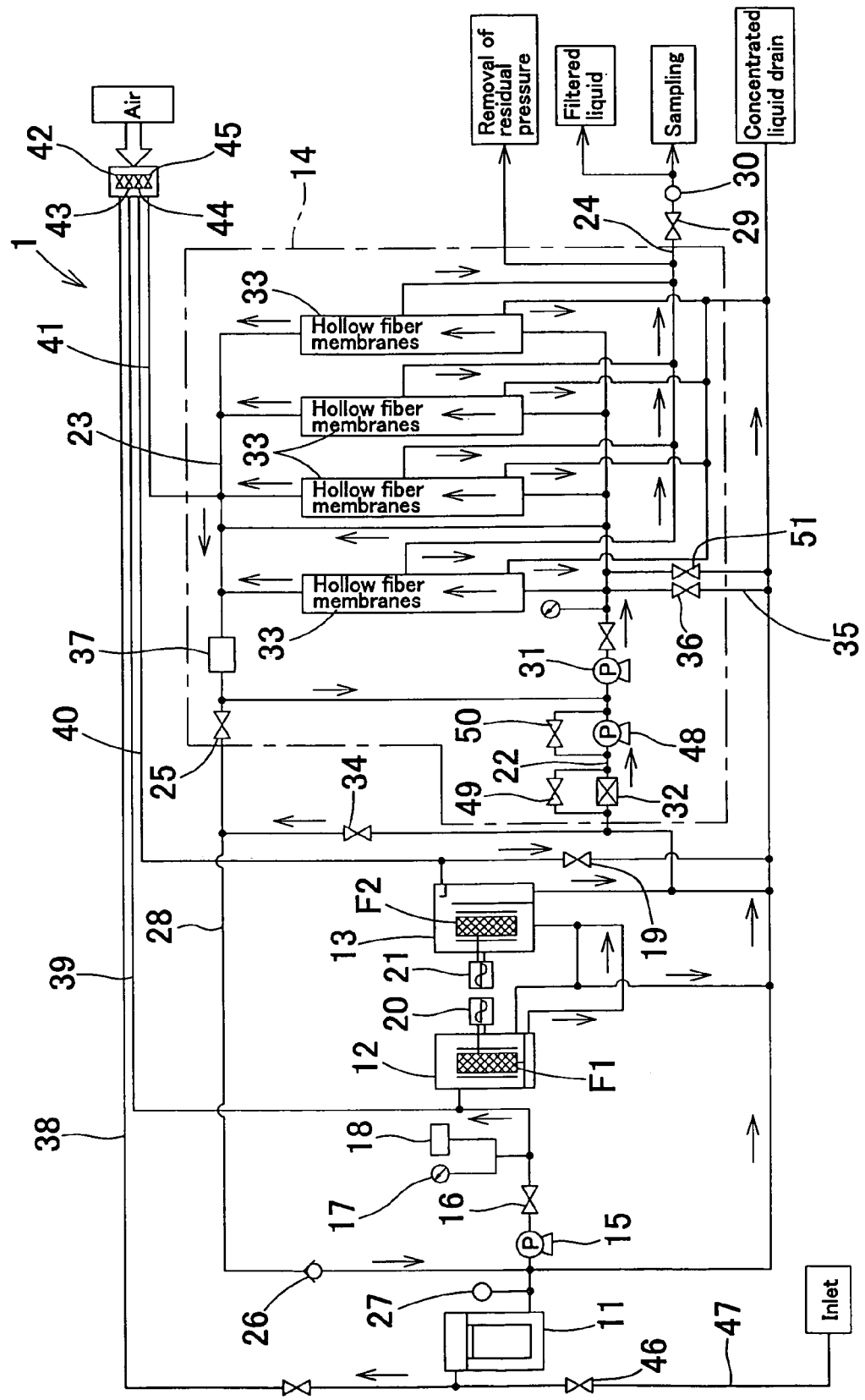
FIG. 3 is an illustrative diagram showing the constitution of a filtration system.

The filtration system 1 is a system already proposed by the present applicants (see Sixth Embodiment of Japanese Patent Publication 2001-46805) which has been improved particularly for installment in a vehicle, and as shown in FIG. 3, is constituted by a bucket strainer 11 for removing coarse contaminated particles, a charged filter device 12 for removing fine contaminated particles, a charged coalescer type oil water separator 13 for performing oil water separation, and a microfiltration device 14 constituted by hollow fiber membranes of an internal pressure circulation system.

The charged filter device 12 utilizes a physical filtration action through the meshes of the filter and a coagulation and flocculation phenomenon caused by the neutralization of the zeta potential of oil droplet particles or water molecules. Technology disclosed by the present applicants in Japanese Utility Model Registration Application H3-98913 and Japanese Kokoku Application Publication H8-210 may be used, particularly to precipitate the filtration of impurity particles such as solid particles in the liquid to be treated.

The oil water separator 13 utilizes the coagulation and flocculation phenomenon caused by zeta potential neutralization and also utilizes oil/water separation by unit of emulsion separation in a coalescer. In this example, the oil water separator 13 is specifically a charged coagulation filter/coalescer type oil water separator having a compound filter F2 which comprises a filter layer and a coalescer layer, and thus functions as both a charged filter device and an oil water separator. The oil water separator 13 precipitates trapping of the impurity particles and oil/water separation through coagulation and flocculation of oil droplet particles or water molecules.

By applying a charge to both a filter F1 and the compound filter F2 or disposing these filters in an electric field and applying a potential to the filters or filter surfaces, repulsion due to Coulomb force which is caused by the zeta potential possessed by impurity particles such as the contamination and oil which pass through the filters is eliminated, and an inter-particle attraction which acts as a natural force between these impurity particles is used to coagulate and enlarge the impurity particles of contamination, oil, and so on. The impurity particles are then removed from the liquid. Particularly in the charged filter device 12, layers of coagulated and flocculated contamination accumulate on the surface of the filter F1, which has meshes of several microns, to form a cake layer, and since this cake layer also functions as a filter, extremely high precision filtration is possible.

The inflow side of the charged filter device 12 is connected to the strainer 11 through a pump 15, a flow regulating valve 16, a pressure gauge 17, and a pressure switch 18, and discharged liquid from the charged filter device 12 flows into the oil water separator 13. The oil water separator 13 is provided with an automatic valve 19 to discharge separated floating oil and the charged filter device 12 and oil water separator 13 are respectively provided with charge sources 20, 21, all of which are supplied with power from the aforementioned electric power supply unit 4. The discharged liquid from the oil water separator 13 is supplied to the microfiltration device 14 through an introduction passage 22 which is connected to the primary side circulation path 23 of the microfiltration device 14, and the filtered liquid discharged from the microfiltration device 14 is delivered to the collection unit 9 or another collection unit through a delivery passage 24 comprising a motor-operated valve 29 and the integrating flowmeter 30.

A valve 25 and a check valve 26 are provided at points on a primary reflux passage 28 such that the reflux passage 28, the end of which is connected to the vicinity of the connecting location of a vacuum gauge 27 provided at a point on a liquid dispatching passage to the charged filter device 12, is bifurcated. The reflux passage 28 is used to continuously recirculate a portion of the concentrated circulating liquid, which is concentrated in the primary side circulation path 23, to the suction side of the pump 15 in the charged filter device 12 such that this portion of concentrated liquid is repeatedly reprocessed by the charged filter device 12 and oil water separator 13.

In the filtration system of this example, first liquid to be treated which has been aspirated by the pump 15 passes from the collection unit 9 through the strainer 11 and is then adjusted to a constant flow rate by the flow regulating valve 16 and forced by pressure into the charged filter device 12. The suction state of the pump 15 and blockages in the meshes of the filter F1 in the charged filter device 12 are monitored by the vacuum gauge 27 and pressure gauge 17 respectively.

The liquid to be treated which has been forced by pressure into the charged filter device 12 flows through the filter F1, which doubles as a charge pole, from the outer peripheral face to the inner peripheral face, and is discharged outside of the container through the inside of the hollow fiber filter. While passing through the filter F1 doubling as a charge pole, contamination and the like in the liquid to be treated is coagulated and flocculated by an electric field action so as to be efficiently trapped in the filter F1, and thus contaminated particles of several tens of microns or more are almost all removed from the liquid to be treated.

The liquid to be treated which has been discharged from the charged filter device 12 is then forced by pressure into the oil water separator 13. Inside the oil water separator 13, the liquid to be treated enters the compound filter F2 and flows from the inner peripheral face of the filter toward the outer peripheral face. As the liquid to be treated passes through the filter, impurity particles such as contamination and oil are removed by an electric charge effect, and the coagulation and flocculation of oil droplet particles is advanced such that the emulsive state of the oil is broken down. The liquid to be treated containing flocculated oil droplet particles rises and falls through a by-pass formed from an annular partition plate, and in so doing the oil is caused to separate and float due to differences in specific gravity, thereby forming a floating oil layer on an upper layer of the container. When the level of the interface between the floating oil layer and separated water layer lowers, an oil water interface sensor (not shown) defects this state and opens the automatic valve 19 such that the separated oil is discharged. The separated water is extracted from the bottom portion of the container and transmitted to the microfiltration device 14. The oil water separator 13 is a single device but performs both the removal of impurity particles and oil water separation. The device is small and high-performance and is therefore particularly appropriate as a filtration device for installment in a vehicle such as that of the present invention. Hence the charged filter device 12 described above may be omitted.

A part of the liquid to be treated discharged from the oil water separator 13 is transmitted to the microfiltration device 14 of the next stage, and the remaining part which exceeds the processing capacity of the microfiltration device 14 is returned to the charged filter device 12 through the reflux passage 28.

The liquid to be treated is aspirated by the pump 31 from the discharged liquid of the oil water separator 13 and is then introduced into the microfiltration device 14. The liquid to be treated is introduced into the microfiltration device 14 by being caused to flow into the primary side circulation path 23 through an introduction passage 22 and then being forced by pressure into several microfiltration units 33 which are provided in parallel. A heater 32 and a booster pump 48 are provided on the introduction passage 22, and bypass circuits provided with open/close valves 49, 50 are provided in parallel to the heater 32 and booster pump 48 respectively. The heater 32 suppresses increases in the viscosity of the liquid to be treated during winter, and the booster pump 48 reinforces the pump 31. When the heater 32 and booster pump 48 need not be used, they may be bypassed by opening the open/close valve 49 or 50. The liquid to be treated forced by pressure into the microfiltration unit 33 passes through a primary side channel within the container of the microfiltration unit 33 and is then discharged outside of the container. As the liquid to be treated passes through the container, the liquid passes through hollow fiber membranes such as ultrafilters or microfilters, which are disposed between the primary side and a secondary side of the container, whereby a part of the liquid to be treated is caused to pass into a secondary side of the container and is discharged. Microfilters with filter meshes of between 0.005 and 0.02 µm are preferably used as the hollow fiber membranes so that active components can be retained during treatment.

Here, four microfiltration units 33 are provided in a vertical direction, but the number may be set freely in accordance with the amount of processing. Further, the piping is provided along the floor of the cargo compartment C to lower the center of gravity of the vehicle A. A similar object may be achieved by disposing the microfiltration units at an incline or horizontally.

The filtered liquid discharged outside of the microfiltration device through the secondary side channel outside of the container of the microfiltration units 33 is dispatched through the delivery passage 24 into the collection unit 9 or another collection unit. The liquid circulating through the primary circulation path 23, on the other hand, is concentrated to a degree corresponding to the amount of discharged filtered fluid, and in this example, a part of the concentrated liquid circulating through the primary side passes through the reflux passage 28 to be continuously recirculated to the suction side of the pump 15 of the charged filter device 12, whereby contamination and oil are removed repeatedly from the concentrated liquid by the charged filter device 12 and oil water separator 13. In so doing, concentration of the liquid circulating through the primary side which circulates through the primary side circulation path 23 can be prevented as much as possible. By providing the reflux passage 28, concentration of the liquid circulating through the primary side is reduced, and thus the load on the microfiltration device 14 is greatly lightened such that the life of the filter membranes in the microfiltration units 33 can be greatly extended.

The remainder of the separated liquid discharged from the oil water separator 13 which is not suctioned from the bottom portion into the next-stage hollow fiber membranes such as ultrafilters or microfilters passes through a valve 34 into the reflux passage 28 and is recirculated untreated to the suction side of the pump 15 of the charged filter device 12 in a similar manner. In this case, as the circulating liquid passes between the processing device C and membrane device to be reprocessed again and again, the circulating liquid is concentrated to a degree corresponding to the part which is automatically discharged at a gradually decreasing concentration rate. A discharge passage 35 to discharge the concentrated liquid which has been gradually concentrated is provided on the primary side circulation path 23 so as to be bifurcated therefrom, and open/close valves 36, 51 are provided on the discharge passage 35. The open/close valves 36, 51 discharge the concentrated liquid from the primary side circulation path 23 in appropriate amounts, thereby forestalling blockages of meshes in the hollow fiber membranes inside the microfiltration units 33.

The open/close valve 36 is constituted by a motor valve which may be opened and closed when an operator periodically operates a button or the like. In this example, control is performed by the control unit 5 described above such that the valve is opened at predetermined time intervals set in accordance with the type of the liquid to be treated. The open/close valve 51 is an electromagnetic valve for controlling discharge of the concentrated liquid which is opened by the control unit 5 in a similar manner when the density of the concentrated liquid, detected by a concentration detection unit 37 for detecting the density of the concentrated liquid which is provided on the primary side circulation path 23, exceeds a predetermined value. Thus, although the time required for concentration differs depending on the type or cleanliness of the liquid to be treated, a predetermined degree of concentration can be detected such that the concentrated liquid can be discharged efficiently at an appropriate time. The concentration detection unit 37 is provided in consideration of the fact that viscous resistance varies according to concentration, and is constituted by a pressure sensor provided on the primary side circulation path for detecting pressure changes therein. The concentration detection unit 37 indirectly detects concentration variation according to the viscous resistance of the liquid to be treated flowing through the circulation path.

Here, the control unit 5 preferably makes a warning signal such as a light or sound to inform the operator to open the open/close valve 36 following the elapse of a predetermined time period set in accordance with the type of the liquid to be treated. The operator may be informed by this warning signal using a warning light 7 or speaker provided on the vehicle A.

Air supply pipes 38, 39, 40, 41 are respectively connected to the strainer 11, charged filter device 12, oil water separator 13, and microfiltration device 14, which constitute the filtration system 1 described above, to drain or to backwash each device upon completion of an operation by applying air thereto, and open/close valves 42 through 45 provided on each pipe are installed side by side in a single location to open and close each of the pipes at this one location.

Irregularities in the open/close valves and pumps 15, 31, 48 are detected using the pressure gauge 17 and so on as sensors. The control unit 5 store and manage data transmitted from each pressure gauge in a memory device 6, and when an irregularity is detected, a warning signal is made by warning unit such as the warning light 7.

Note that a suction pipe 47 for aspirating contaminated liquid from within the contaminated liquid collection unit 9 is provided as the suction unit 2, and an electromagnetic valve 46 is provided at a point on the suction pipe 47 for opening and closing the pipe. During the aforementioned draining or backwashing, the electromagnetic valve 46 is closed by the control unit 5, and thus improper use can be forestalled. Further, one or a plurality of image-capturing devices 8 is provided in an appropriate location on the vehicle A for capturing images of the constitutional elements of the filtration system 1 such as the pipes and open/close valves. Image information captured by the image-capturing devices 8 is stored and managed in the memory device 6 and used to discover irregularities, prevent unauthorized use, and so on.

The filtration system 1 described above is installed inside the cargo compartment C which is removably connected to the main body of the vehicle, and by constituting the filtration system so as to be replaceable within the cargo compartment, providing a plurality of the cargo compartments C, and switching the cargo compartments C among the trucks B, operational management of each of the vehicles can be performed efficiently. For example, the filtration system 1 is transported to a work site and unloaded there with the cargo compartment to perform a filtration operation. The truck B is now empty, and so the truck B goes to pick up load-carrying platform carrying another filtration system. The truck B then transports the filtration system to another work site, and thus filtration systems may be disposed at a plurality of work sites by one truck B. Here, if the filtration system 1 is operated automatically and is unmanned, the system within the cargo compartment C and the operating cab of the truck B should be connected via a communication line or the like such that the progress or completion of the operation can be reported to the operator driving the truck B by radio. Further, if the truck B is constituted by a trailer truck for towing a trailer comprising the cargo compartment C, the filtration system need not be loaded and unloaded, thereby enabling an improvement in work performance. If the trailer is constituted by a full trailer rather than a semi-trailer, the filtration system may be installed in one cargo compartment or divided between two cargo compartments. Note that the filtration system 1 may be installed on an open load-carrying platform with a removable top rather than in the cargo compartment C.

INDUSTRIAL APPLICABILITY

According to the contaminated liquid filtration system vehicle of the present invention, by traveling to a contaminated liquid collection unit in a factory or the like, aspirating and filter treating the contaminated liquid in the contaminated liquid collection unit as liquid to be treated, and returning the processed liquid to the same or another collection unit in the factory or the like, the contaminated liquid in the collection unit can undergo processing such as recycling and contamination reduction swiftly and efficiently without being disposed of by incineration.

In the charged coalescer type oil water separator a voltage is applied between electrodes inside the oil water separator by a driving power source supplied from the electric power supply unit, thus advancing coagulation and flocculation of the oil droplet particles and water molecules in the liquid to be treated and precipitating oil water separation. As a result, the contaminated liquid can be regenerated swiftly and efficiently.

Further, the discharge passage to discharge concentrated liquid bifurcates from the primary side circulation path of the microfiltration device comprised of hollow fiber membranes of an internal pressure circulation system, and an open/close valve is provided on the discharge passage. The open/close valve is opened by the control unit at predetermined time intervals set in accordance with the type of the liquid to be treated, thereby controlling discharge of the concentrated liquid. Hence the concentrated liquid can be discharged at an optimum timing in accordance with the type of the contaminated liquid, which differs according to the factory facilities, and blockages of the meshes in the microfiltration device can be efficiently prevented.

Further, the concentration detection unit for detecting the density of the concentrated liquid is provided on the primary side circulation path, and the control unit control the discharge of the concentrated liquid by opening the open/close valve when the density of the concentrated liquid inside the primary side circulation path, which is detected by the concentration detection unit, exceeds a predetermined value. By detecting the concentration of the contaminated liquid, which differs according to the factory facilities, the concentration of the contaminated liquid can be judged uniformly, and hence the contaminated liquid can be discharged at an optimum timing regardless of the type of the contaminated liquid.

A pressure sensor which detects pressure changes inside the primary side circulation path is provided as the concentration detection unit, and concentration variation is detected indirectly according to the viscous resistance of the liquid to be treated which flows through the circulation path. Thus concentration variation can be detected reliably and at low cost.

A sensor is also provided for detecting irregularities in the open/close valve on the discharge passage, and warning unit is provided to make a warning signal in case of the irregularities in the open/close valve detected by the sensor. Thus blockages in the meshes of the microfiltration device caused by a fault in the open/close valve can be forestalled.

Further, a warning signal such as a light or sound for advancing the opening of the open/close valve on the discharge passage is provided following the elapse of a predetermined amount of time set in accordance with the type of the liquid to be treated, and thus, upon reception of this warning signal, an operator can open the open/close valve manually, and when the open/close valve is opened and closed automatically, the opening of the valve can be ensured.

Moreover, a sensor is provided for detecting irregularities in the pump of the microfiltration device, and warning unit are provided to make a warning signal in case of irregularities in the pump detected by the sensor, and thus a deterioration in work performance due to irregularities in the pump can be prevented.

The filtration system comprises a plurality of devices including the oil water separator and the microfiltration device constituted by the internal pressure circulation system hollow fiber membranes. Air supply pipes are disposed in a single location to drain each device, and open/close valves are installed side by side on each pipe, and thus an operator is able to perform an air supply operation efficiently in a single location.

A suction pipe for aspirating the contaminated liquid inside the contaminated liquid collection unit is provided as the aforementioned suction unit, and an electromagnetic valve is provided at a point on this pipe to open and close the pipe. The control unit closes the electromagnetic valve during draining, and thus improper use can be forestalled.

Further, an image-capturing device is provided for capturing images of constitutional elements such as the filtration system piping, and a memory device is provided for storing and managing image information captured by the image-capturing device. Thus breakdowns in each unit can be detected and improper conduct can be prevented.

A power generation device which is driven by the driving engine constituting the aforementioned vehicle driving unit is provided as the aforementioned electric power supply unit, and thus the driving device may be constituted efficiently without the need for another driving device.

Further, the filtration system is disposed inside a cargo compartment which is removably connected to the main body of the vehicle, and the filtration system is constituted so as to be replaceable with the cargo compartment. Hence, by providing a plurality of cargo compartments and switching the compartments among trucks, operational management of the vehicles can be performed efficiently and the processing operation of the present invention can be responded to flexibly.

The invention claimed is:

1. A contaminated liquid filtration system vehicle which travels to a contaminated liquid collection unit in a factory or the like and treats the contaminated liquid within the collection unit, comprising:

vehicle driving unit comprising a driving engine and a driving mechanism;

suction unit for aspirating the contaminated liquid within said contaminated liquid collection unit as liquid to be treated;

a filtration system constituted by a charged filter device, a charged coalescer type oil water separator, and a microfiltration device comprising hollow fiber membranes of an internal pressure circulation system, for filtration treating the aspirated liquid to be treated;

electric power supply unit for supplying a driving power source to said filtration system;

delivery unit for returning treated liquid which has been treated in said filtration system to the same or a different collection unit in the factory or the like; and control unit for controlling operations of said filtration system, wherein said charged filter device is caused to advance the filtration of impurity particles by applying a voltage between electrodes within said charged filter device using the driving power source supplied from said electric power supply unit, said charged coalescer type oil water separator is caused to advance oil water separation by applying a voltage between electrodes within the oil water separator using the driving power source supplied from said electric power supply unit, and wherein the discharge path to discharge the concentrated liquid bifurcates from the primary side circulation path of said microfiltration device, the open/close valve is provided on the discharge path, a concentration detection unit for detecting the density of the concentrated liquid is provided on said primary side circulation path, and said control unit control the discharge of said concentrated liquid by opening the open/close valve when the concentration of the concentrated liquid in the primary side circulation path, which is detected by said concentration detection unit, exceeds a predetermined value.

2. The contaminated liquid filtration system vehicle according to claim 1, wherein said concentration detection unit is constituted by a pressure sensor for detecting pressure change inside the primary side circulation path, and concentration variation is detected indirectly thereby according to the viscous resistance of the liquid to be treated flowing through said circulation path.

3. A contaminated liquid filtration system vehicle which travels to a contaminated liquid collection unit in a factory or the like and treats the contaminated liquid within the collection unit, comprising:

vehicle driving unit comprising a driving engine and a driving mechanism;

suction unit for aspirating the contaminated liquid within said contaminated liquid collection unit as liquid to be treated;

a filtration system constituted by a charged filter device, a charged coalescer type oil water separator, and a microfiltration device comprising hollow fiber membranes of an internal pressure circulation system, for filtration treating the aspirated liquid to be treated;

electric power supply unit for supplying a driving power source to said filtration system;

delivery unit for returning treated liquid which has been treated in said filtration system to the same or a different collection unit in the factory or the like; and control unit for controlling operations of said filtration system, wherein said charged filter device is caused to advance the filtration of impurity particles by applying a voltage between electrodes within said charged filter device using the driving power source supplied from said electric power supply unit, said charged coalescer type oil water separator is caused to advance oil water separation by applying a voltage between electrodes within the oil water separator using the driving power source supplied from said electric power supply unit, and wherein the discharge path to discharge the concentrated liquid bifurcates from the primary side circulation path of said microfiltration device, the open/close valve is provided on the discharge path, and said control unit output a warning signal such as a light or sound for advancing opeining of said open/close valve following the elapse of a predetermined time period set in accordance with the type of the liquid to be treated.

4. The contaminated liquid filtration system vehicle according to claim 1, comprising a sensor for detecting irregularities in the pump of said microfiltration device and warning unit for making a warning signal on the basis of irregularities in the pump detected by said sensor.

5. The contaminated liquid filtration system vehicle according to claim 1, wherein a suction pipe for aspirating the contaminated liquid in the contaminated liquid collection unit is provided as said suction unit, an electromagnetic valve is provided at a point on the channel of said suction pipe for opening and closing said channel, and said control unit prevent improper use by closing said electromagnetic valve during said draining.

6. The contaminated liquid filtration system vehicle according to claim 1, comprising an image capturing device to capture images of constitutional elements such as the piping of the filtration system, and a memory device for storing and managing image information captured by said image capturing device.

7. The contaminated liquid filtration system vehicle according to claim 1, comprising a power generating device serving as said electric power supply unit which is driven by the driving engine constituting said vehicle driving unit.

8. The contaminated liquid filtration system vehicle according to claim 1, wherein said filtration system is installed on a load-carrying platform which is removably connected to the vehicle main body, and said filtration system is constituted so as to be detachable with a cargo compartment.

9. The contaminated liquid filtration system vehicle according to claim 1, comprising a sensor for detecting irregularities in said open/close valve and warning unit for outputting a warning signal on the basis of the irregularities in the open/close valve detected by said sensor.

10. The contaminated liquid filtration system vehicle according to claim 1, comprising a sensor for detecting irregularities in the pump of said microfiltration device and warning unit for making a warning signal on the basis of irregularities in the pump detected by said sensor.

11. The contaminated liquid filtration system vehicle according to claim 1, wherein a suction pipe for aspirating the contaminated liquid in the contaminated liquid collection unit is provided as said suction unit, an electromagnetic valve is provided at a point on the channel on the channel of said suction pipe for opening and closing said channel, and said control unit prevent improper use by closing said electromagnetic valve during said draining.

12. The contaminated liquid filtration system vehicle according to claim 1, comprising an image capturing device to capture images of constitutional elements such as the piping of the filtration system, and a memory device for storing and managing image information captured by said image capturing device.

13. The contaminated liquid filtration system vehicle according to claim 1, comprising a power generating device serving as said electric power supply unit which is driven by the driving engine constituting said vehicle driving unit.

14. The contaminated liquid filtration system vehicle according to claim 1, wherein said filtration system is installed on a load-carrying platform which is removably connected to the vehicle main body, and said filtration system is constituted so as to be detachable with a cargo compartment.

* * * * *